United States Patent [19]

Deki et al.

[11] Patent Number: 4,868,840
[45] Date of Patent: Sep. 19, 1989

[54] METAL VAPOR LASER DEVICE

[75] Inventors: Kyoichi Deki; Shinji Sugioka, both of Kakogawa; Masaki Yoshioka, Izumi; Hiroshige Hata, Himeji, all of Japan

[73] Assignee: Ushio Deki Kabushiki Kaisha, Tokyo, Japan

[21] Appl. No.: 250,513

[22] Filed: Sep. 29, 1988

[30] Foreign Application Priority Data

Mar. 25, 1988 [JP] Japan ............................. 63-38338[U]

[51] Int. Cl.⁴ .......................... H01S 3/22; H01S 3/223
[52] U.S. Cl. ........................................ 372/56; 372/55; 372/60; 372/61
[58] Field of Search ......................... 372/56, 55, 60, 61

[56] References Cited

U.S. PATENT DOCUMENTS 4,232,274 11/1980 Tokudome et al. .................. 372/56
4,237,430 12/1980 Liu et al. ............................. 372/56

FOREIGN PATENT DOCUMENTS 2085647 4/1982 United Kingdom ................. 372/56

OTHER PUBLICATIONS

Paper published under SPIE vol. 741, Design of Optical Systems Incorporating Low Power Laser, 1987, pp. 31-38.
Paper Published under He-Cd Laser of Long Life and Low Noise in Laser Research vol. 8, No. 2, 1980, pp. 65-72.
Paper published under White Laser in 1986, pp. 31-40.

Primary Examiner—William L. Sikes
Assistant Examiner—Georgia Y. Epps
Attorney, Agent, or Firm—Robert E. Ziems

[57] ABSTRACT

A metal vapor laser device wherein the pressure of carrier gas within a metal vapor laser tube can be normally maintained constant and a stabilized laser beam can be generated. The metal vapor laser device comprises a metal vapor laser tube, and a carrier gas supplier for supplementing carrier gas into the metal vapor laser tube. The carrier gas supplier includes an outer tube substantially impermeable to the carrier gas, and an inner tube having a permeability to the carrier gas which varies according to temperature and partitioning the inside of the outer tube into a reservoir section and a tank section. The inner tube is disposed in the tank section of the outer tube in such a manner as to form a duplex tube. The carrier gas supplier further includes a heater provided on outer peripheries of regions of the outer tube including the reservoir section and the tank section.

6 Claims, 1 Drawing Sheet

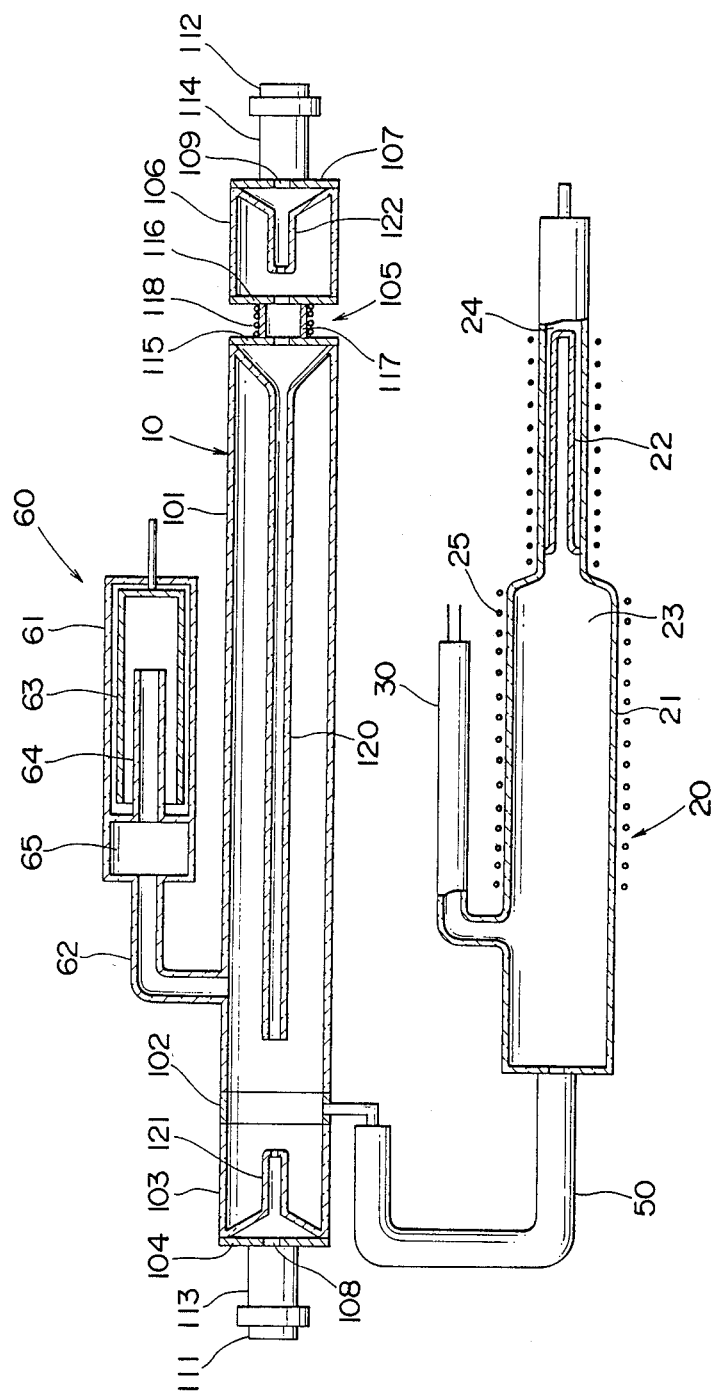
FIG. I

METAL VAPOR LASER DEVICE

BACKGROUND OF THE INVENTION

1. Field of the Invention

This invention relates to a metal vapor laser device.

2. Description of the Prior Art

A metal vapor laser device generates laser oscillations making use of vapor of a working metal which is enclosed in a laser tube together with a carrier gas.

An exemplary one of metal vapor laser devices which are practically used at present is a so-called positive column type metal vapor laser device which generates laser oscillations making use of a positive column portion of a discharge. More particularly, a positive column type He-Cd laser device is known wherein helium is used as a carrier gas and cadmium is used as a working metal.

Such a He-Cd laser device can continuously oscillate, for example, an ultraviolet ray having a wavelength of 325 nm as well as visible ray having a wavelength of 442 nm in a short wavelength zone. Due to the characteristic, the demand for such He-Cd lasers has increased in recent years, and He-Cd laser devices are used in various fields as light sources, for example, for laser printers, holography, photo-plotters, color scanners and so on.

In a metal vapor laser device, when metal vapor is condensed on an inner wall of a laser tube, helium gas is trapped in the condensed metal so that the pressure of the helium gas in the laser tube decreases. Consequently, an output laser beam is liable to become unstable.

In order to prevent this, a helium gas supplier is conventionally connected to the metal vapor laser tube to supply helium gas suitably into the metal vapor laser tube.

An exemplary one of such conventional helium gas suppliers includes an outer tube substantially impermeable to helium gas, a partition having a helium gas permeability which varies according to temperature and partitioning the inside of the outer tube into a tank section and a reservoir section which communicates with the inside of a laser tube, and a heater for controlling the temperature of the partition. The temperature of the partition is thus regulated by the heater to control the permeability of the partition to helium gas.

The helium gas supplier of such a construction described just above, however, has a drawback that, since the heater is disposed on an outer periphery only of a portion of the outer tube near the partition, when the pressure within the metal laser tube is changed by a sudden change of the ambient temperature, it takes a considerable time until the pressure is restored to the original level as a result of supplement of helium gas into the metal vapor laser tube, and after all, the response of the helium gas supplier is so slow that it cannot respond sufficiently rapidly to a change of the pressure and consequently the output laser power thereof becomes unstable:

SUMMARY OF THE INVENTION

It is an object of the present invention to provide a metal vapor laser device wherein the pressure of carrier gas within a metal vapor laser tube can be normally maintained constant and a stabilized laser beam can be generated.

In order to attain the object, according to the present invention, a metal vapor laser device comprises a metal vapor laser tube, and a carrier gas supplier for supplementing carrier gas into the metal vapor laser tube, the carrier gas supplier including an outer tube substantially impermeable to the carrier gas, an inner tube having a permeability to the carrier gas which varies according to temperature and partitioning the inside of the outer tube into a reservoir section and a tank section, the inner tube being disposed in the tank section of the outer tube in such a manner as to form a duplex tube, and a heater provided on outer peripheries of regions of the outer tube including the reservoir section and the tank section.

With the metal vapor laser device of the construction described just above, the inner tube of the carrier gas supplier which partitions the inside of the outer tube into the reservoir section and the tank section is disposed in the tank section of the outer tube in such a manner as to form a duplex tube, and the heater is provided on the outer peripheries of the regions of the outer tube including the reservoir section and the tank section. Accordingly, by control in heating of the region of the outer tube including the tank section, temperature control of the inner tube and temperature control of the inside of the tank section can be attained, and the metal vapor laser device can cope with reduction of the pressure of the carrier gas which may be caused principally by a trap when the metal vapor is condensed on an inner wall of the metal vapor laser tube. Simultaneously, by control in heating of the region of the outer tube including the reservoir section, the metal vapor laser device can rapidly cope with reduction in pressure of the carrier gas which may be caused principally by reduction of the ambient temperature of the laser tube. As a result, the pressure of the carrier gas within the metal vapor laser tube can be normally maintained constant, and a stabilized laser output can be obtained.

The above and other objects, features and advantages of the present invention will become apparent from the following description and the appended claims, taken in conjunction with the accompanying drawing.

BRIEF DESCRIPTION OF THE DRAWING

FIG. 1 being a sole figure is a schematic sectional view of a metal vapor laser device showing a preferred embodiment of the present invention.

DESCRIPTION OF THE PREFERRED EMBODIMENT

Referring first to FIG. 1, there is shown a metal vapor laser device according to a preferred embodiment of the present invention. The metal vapor laser device shown has a structure of the internal resonator type and also of the external cathode type and includes a metal vapor laser tube 10 for oscillating, for example, a He-Cd laser beam, a carrier gas supplier 20, a pressure detector 30 and a cathode container 60.

The metal vapor laser tube 10 is composed of a straight central glass tube 101, an end glass tube 103 connected in an air-tight relationship to an end (left end in FIG. 1) of the central grass tube 101 by way of a connecting metal tube 102, an end metal disk 104 provided in such a manner as to close an opening of the end glass tube 103, another end glass tube 106 connected in an air-tight relationship to the other end (right end in FIG. 1) of the central glass tube 101 by way of a metal tank 105, and another end metal disk 107 provided in such a manner as to close an opening at the outer end of the end glass tube 106 and serving as an anode. Each of the end metal disks 104 and 107 has a through-hole 108 or 109 perforated at the center thereof and has a mirror holding tube 113 or 114 secured thereto, respectively. A mirror 111 or 112 which constitutes a resonator is secured to each of the mirror holding tubes 113 and 114, respectively.

Meanwhile, the metal tank 105 is composed of a metal disk 115 provided at the other end (right end in FIG. 1) of the central glass tube 101, another metal disk 116 provided at an inner end of the end glass tube 106, and a metal tube 117 of a smaller diameter interconnecting the two disks 115 and 116. A heater 118 is provided on an outer periphery of the metal tube 117 while a working metal such as, for example, cadmium metal is disposed within the metal tube 117.

A thin glass tube 120 is disposed in the central glass tube 101. The thin glass tube 120 is connected at an end thereof to the end of the central glass tube 101 adjacent the metal tank 105 and extends along an axis of the central glass tube 101. A pair of discharge path controlling glass tube 121 and 122 are disposed in the end glass tubes 103 and 106, respectively. The discharge path controlling glass tubes 121 and 122 are connected to outer ends of the end glass tubes 103 and 106 and extend along axes of the end glass tubes 103 and 106, respectively.

The cathode container 60 is composed of a glass tube 61 one end of which is connected, by way of a connecting tube 62, to a portion of a circumferential wall of the central glass tube 101 near the connecting metal tube 102. A cathode 63 made of, for example, tubular aluminum is disposed in the glass tube 61. The cathode 63 is closed at an outer end (right end in FIG. 1) thereof. A discharge controlling thin glass tube 64 is formed on an inner face of the circumferential wall of the glass tube 61 and extends into the cathode 63. A metal vapor trap 65 is defined in the glass tube 61 between the connecting tube 62 and the discharge controlling thin glass tube 64.

The carrier gas supplier 20 is connected to the metal vapor laser tube 10 at the connecting metal tube 102 of the latter by means of a connecting tube 50. The carrier gas supplier 20 includes an outer tube 21 substantially impermeable to the carrier gas, and an inner tube 22 made of a material having a permeability to the carrier gas which varies according to temperature and provided in a coaxial relationship within a small diameter portion of the outer tube 21 in such a manner as to form a duplex tube together with the outer tube 21. The inner tube 22 thus partitions the inside of the outer tube 21 into a reservoir section 23 and a tank section 24. The carrier gas supplier 20 further includes a heater 25 provided on outer peripheries of regions of the outer tube 21 including the reservoir section 23 and the tank section 24. The pressure detector 30 is connected to the carrier gas supplier 20 and adapted to detect the pressure of the carrier gas within the reservoir section 23. The pressure detector 30 may be, for example, a Pirani sensor. The reservoir section 23 communicates with an inner discharge spacing of the metal vapor tube 10 by way of a connecting tube 50. Accordingly, the pressure of the carrier gas within the reservoir section 23 is maintained substantially the same as the pressure of the carrier gas within the metal vapor laser tube 10.

Since helium gas is used as a carrier gas in the present embodiment, such a material as, for example, quartz glass can be used as a material of the inner tube 22. Especially, quartz glass is superior in temperature dependency of the helium gas permeability so that a supplement of helium gas can be achieved rapidly. Helium gas is thus filled in the tank section 24 of the carrier gas supplier 20 normally at the pressure of 100 to 200 Torr or so, and the pressure of helium gas within the reservoir section 23 is maintained constant normally within a range from 5 to 6 Torr or so. The outer tube 21 of the carrier gas supplier 20 may be formed from such a material as, for example, hard glass.

The heater 25 is formed from a resistance wire such as, for example, a nichrome wire and wound on the entire outer peripheries of the regions of the outer tube 21 including the reservoir section 23 and the tank section 24 with an insulating material (not shown) interposed therebetween. The heater 25 is controlled in response to a signal indicative of a pressure of the carrier gas within the reservoir section 23 of the carrier gas supplier 20 detected by the pressure detector 30 to generate heat so that the pressure of the carrier gas within the reservoir section 23 may remain at a predetermined constant value. As a result, the pressure of the carrier gas within the metal vapor laser tube 10 which communicates with the inside of the reservoir section 23 of the carrier gas supplier 20 by way of the connecting tube 50 is maintained constant. In this instance, since the reservoir section 23 functions as a buffer, a sudden change of the pressure of the carrier gas within the metal vapor laser tube 10 is prevented, which eliminates a possible bad influence on oscillations of a laser beam by the metal vapor laser tube 10.

With the metal vapor laser device having such a construction as described above, a discharge appears between the cathode 63 and the anode provided by the end metal disk 107 via the thin glass tube 120 so that light of a particular wavelength is oscillated as a laser beam by the mirrors 111 and 112 which constitute a resonator.

With the metal vapor laser device of the embodiment described above, the inner tube 22 of the carrier gas supplier 20 which partitions the inside of the outer tube 21 into the reservoir section 23 and the tank section 24 is disposed in the smaller diameter portion of the outer tube 21 which forms the tank section 24 in such a manner as to form a duplex tube, and the heater 25 is provided on the entire peripheries of the regions of the outer tube 21 including the reservoir section 23 and the tank section 24. Accordingly, by control in heating of the region of the outer tube 21 including the tank section 24, the metal vapor laser device can cope with reduction of the pressure of the carrier gas which may be caused principally by a trap when the metal vapor is condensed on an inner wall of the metal vapor laser tube 10. Besides, by control in heating of the region of the outer tube 21 including the reservoir section 23, the metal vapor laser device can rapidly cope with reduction in pressure of the carrier gas which may be caused principally by reduction of the ambient temperature. As a result, the pressure of the carrier gas within the metal vapor laser tube 10 can be normally maintained constant, and a stabilized laser output can be obtained.

Further, with the metal vapor laser device of the embodiment described above, the metal vapor laser tube 10 is simple in construction and easy to produce because it is composed of the central glass tube 101, connecting metal tube 102, end glass tubes 103 and 106, end metal disks 104 and 107 and metal tank 105. The glass tubes here are preferably made of covar glass and the metal tube and the metal disks are preferably made of covar metal.

While the present invention has been described hereinabove in connection with a preferred embodiment thereof, detailed construction of a metal vapor laser tube is not limited to the specific one of the embodiment, and various alterations and modifications may be made to the same.

Besides, the working metal to be enclosed in the metal vapor laser tube is not limited to cadmium and may be any other suitable metal, and the carrier gas to be used in combination with the metal is not limited to helium gas and may be any other suitable gas.

What is claimed is:

1. In a metal vapor laser device comprising a metal vapor laser tube including a resonant cavity and discharge producing electrode means, and a carrier gas supplier for supplying carrier gas to said metal vapor laser tube, the improvement comprising: said carrier gas supplier including an outer tube substantially impermeable to the carrier gas, an inner tube having a permeability to the carrier gas which varies according to temperature and partitioning the inside of said outer tube into a reservoir section and a tank section, said inner tube being disposed in said tank section of said outer tube in such a manner as to form a duplex tube, and a heater provided on outer peripheries of regions of said outer tube including said reservoir section and said tank section.

2. A metal vapor laser device as claimed in claim 1, wherein said tank section of said outer tube of said carrier gas supplier has a smaller diameter than said reservoir section of said outer tube.

3. A metal vapor laser device as claimed in claim 1, wherein the material of said inner tube is quartz glass while the material of said outer tube is hard glass, and the carrier gas is helium gas.

4. A metal vapor laser device as claimed in claim 1, wherein said heater is controlled in response to a signal from a pressure detector which is provided for detecting a pressure of the carrier gas within said metal vapor laser tube.

5. A metal vapor laser device as claimed in claim 4, wherein said pressure detector is connected to said reservoir section of said carrier gas supplier and detects a pressure of the carrier gas within said reservoir section.

6. A metal vapor laser device as claimed in claim 1, wherein said metal vapor laser tube includes a multisectioned glass tube, a metal tube connected coaxially between two sections of the glass tube, an end metal disk on each end of the glass tube, and a mirror which constitutes a resonator is provided on each end metal disk.

* * * * *